Sept. 21, 1965  R. L. SHILTS  3,207,648
TIRE BUILDING APPARATUS
Filed Feb. 1, 1962  2 Sheets-Sheet 1
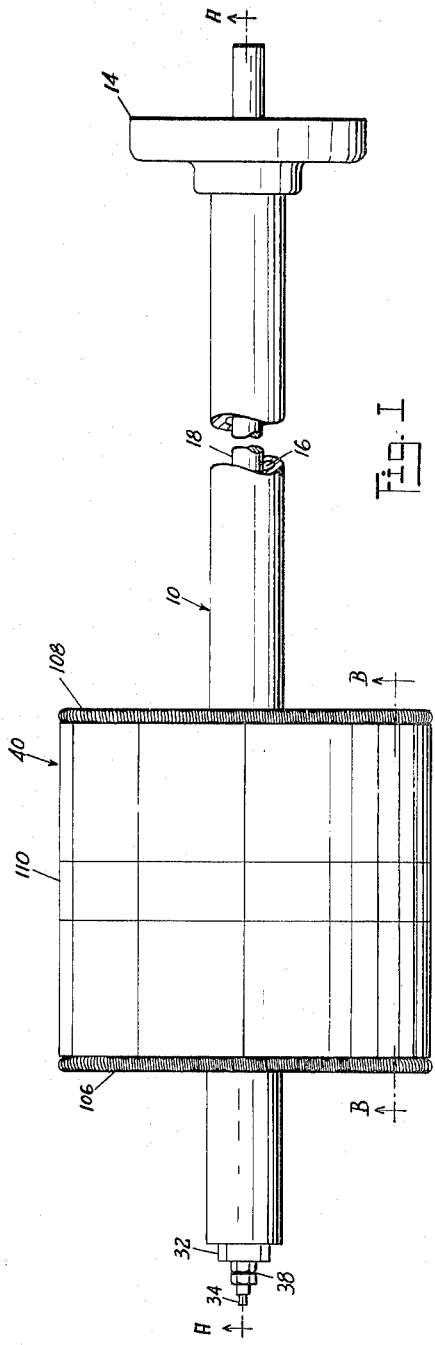
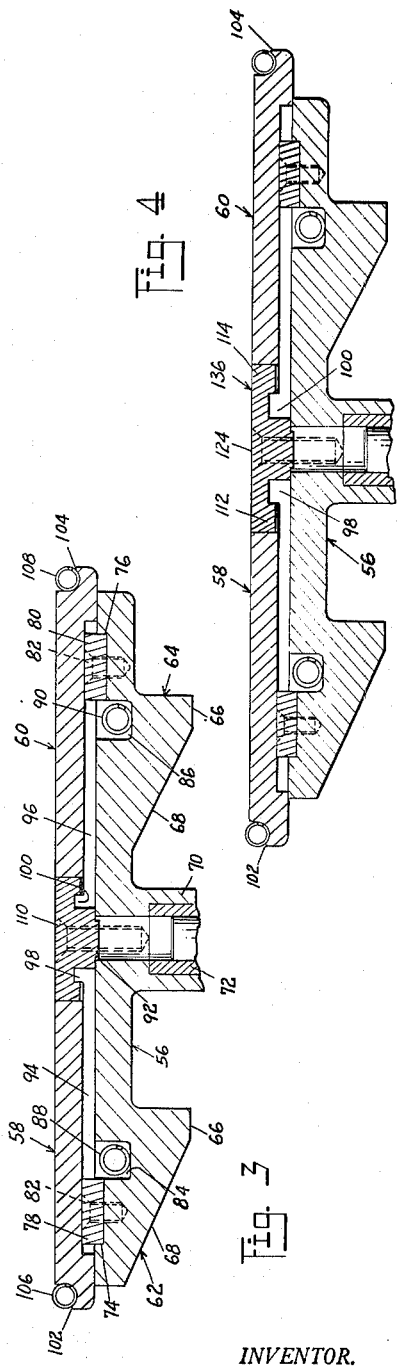
INVENTOR.
RICHARD L. SHILTS
BY
Teare, Fetzer + Teare
ATTORNEYS

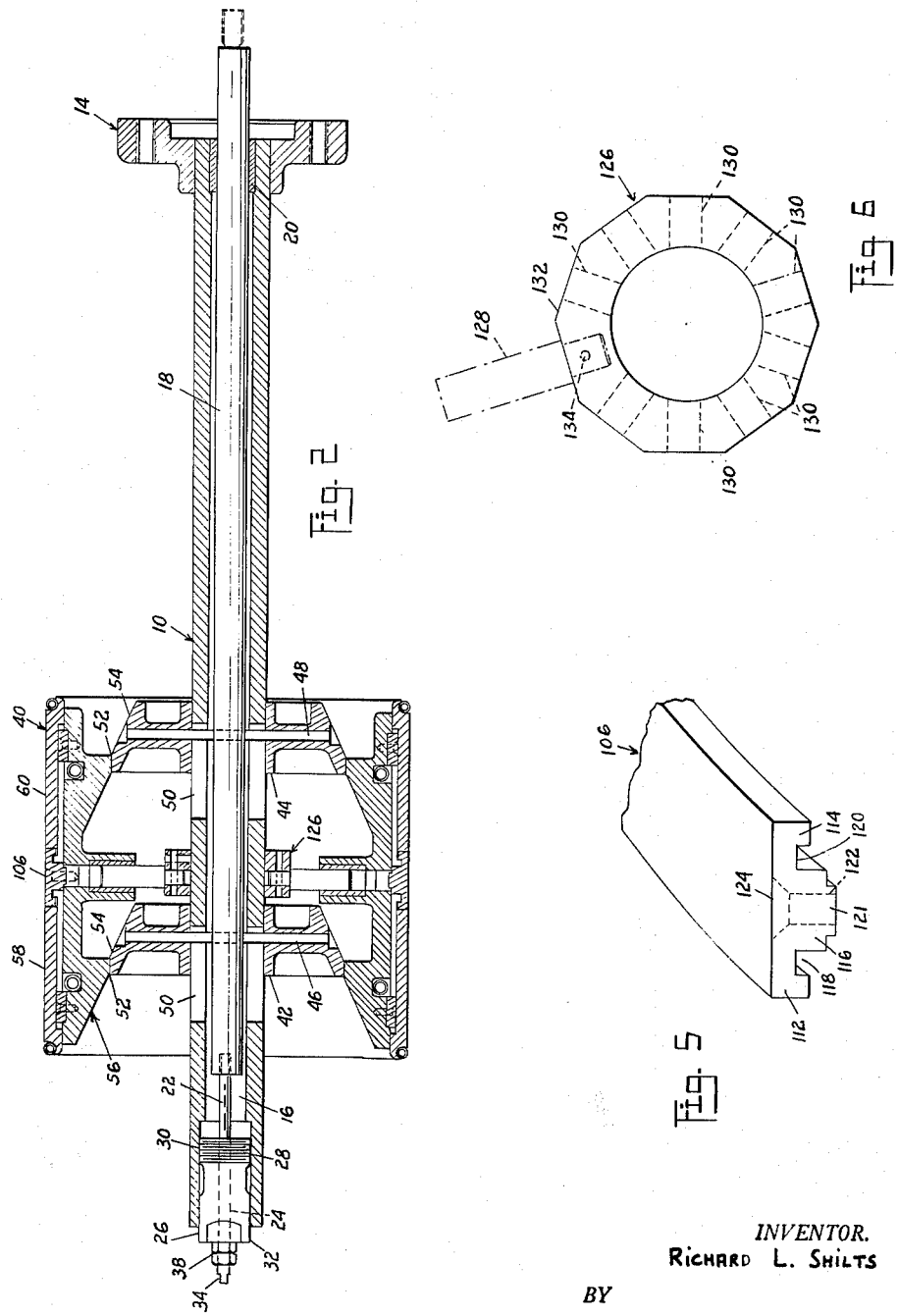

United States Patent Office 3,207,648
Patented Sept. 21, 1965

3,207,648
TIRE BUILDING APPARATUS
Richard L. Shilts, Atwater, Ohio, assignor to The Akron Standard Mold Company, Akron, Ohio, a corporation of Ohio
Filed Feb. 1, 1962, Ser. No. 170,342
10 Claims. (Cl. 156—415)

This invention relates to an improved tire building drum, and more particularly relates to an improved arrangement for axial adjusting the width of the continuous tire building surface of the drum.

In normal practice, tire casings are built by assembling the component parts, such as carcass plies, inextensible beads, and the tread and side wall portions in the form of a flat band on the continuous surface of a rotating building drum. The drum may be composed of a plurality of peripheral drum segments, which are arranged for collapsible movement to reduce the drum diameter and to permit removal of the raw tire band for subsequent shaping and vulcanizing operations. In conventional practice, difficulties have arisen in relation to the collapsing and expanding of the plurality of peripheral drum segments wherein any imprecise control of such movement results in distortion or non-uniformity when the carcass plies are applied or removed from the surface of the tire building drum. Further difficulties have arisen in order to adapt the tire building drum for use in building tires of different widths without disturbing or distorting the continuity of the tire building surface.

In the past, various adjusting assemblies have been utilized to effect a width-wise adjustment of the tire building surface. However, such assemblies have been found to be unsatisfactory, not only from an economic standpoint but from operational standpoint. The adjustment between the peripheral drum segments must be accomplished by a device that is positively and accurately aligned therebetween and in a manner such as not to loosen accidentally or fly-off during the high rotational speeds which are incident to operation of the drum during a portion of the band building cycle. Additionally, such a device must be susceptable to rapid and easy interchangeability between the peripheral drum segments without disturbing or distorting the continuity of the tire building surface.

Accordingly, it is a principal object of this invention to provide an improved arrangement for axial adjusting a plurality of continuous surface drum sections without disturbing the continuity of the tire building surface.

Another object of this invention is to provide an arrangement for axially adjusting a plurality of continuous surface drum segments which can readily be adjusted to different widths, so that on a single drum, it is possible to make the entire range of tires of varying widths without disturbing the continuity of the tire building surface.

A further object of this invention is to provide an arrangement for axially adjusting a plurality of continuous surface drum segments which can be rapidly assembled and disassembled from the drum.

A still further object of this invention is the provision of a more simplified and economical arrangement for adjusting the axially width of a tire building drum without disturbing the continuity of the tire building surface.

Further objects and advantages, and other new and useful features in the construction, arrangement and general combination of elements of the apparatus for adjusting the axial width of the tire building surface will be apparent to those skilled in the art as the following description proceeds with reference to the accompanying drawings, for purposes of illustration, but not of limitation, in which like reference characters designates like parts throughout, wherein:

FIG. 1 is a side-elevational view, with parts broken away and parts in section, of the tire building drum constructed in accordance with the invention shown in the expanded condition mounted on a rotary support;

FIG. 2 is a longitudinal sectional view of the drum taken along the line A—A of FIG. 1;

FIGS. 3 and 4 are enlarged sectional views taken along lines B—B of FIG. 1 to illustrate respective different axially adjusted conditions of the tire building surface;

FIG. 5 is a fragmentary perspective view of a drum spacer member in accordance with the instant invention; and FIG. 6 is a side elevational view of the telescoping hub arrangement in accordance with the instant invention.

The following objects are basically accomplished in accordance with this invention by providing a plurality of segmental drum or wing members which are adapted to be mounted on a plurality of segmental supporting members for rotation about a central axis formed by said members. Each drum or wing member may be secured on the supporting member for width-wise adjustment by endless extensible clamping means which continuously urge the drum or wing sections radially inwardly against the supporting members towards the central axis of the drum. The continuity of the tire building surface may be selectively maintained for desired axial widths with respect to drum or wing members by means of spacer members having marginal flanges coacting in overlapping and interlocking relation with respect to corresponding underlying marginal flanges on the drum or wing members. Suitable guide means may be provided on the supporting members for coacting with guide means provided on the spacer and wing members to locate the spacer members in any selective position on the base members. The axial width of the tire building surface may be readily established simply by releasing the endless extensible clamping means from the marginal edges of the drum or wing members and inter-changing the spacer members for those of the desired size, thereby attaining the required width-wise adjustment of the tire building surface without disturbing the continuity of that surface.

Referring now to FIGS. 1 and 2 of the drawings, there is illustrated the outer end portion of a horizontally disposed quill or shaft 10, which quill is a part of a tire building machine (not shown) and projects therefrom in the usual manner, there being a split coupling 14 secured at one end of the quill 10 adapted to engage a power actuated motor (not shown) for rotating the quill about its longitudinal axes. As shown, the quill 10 is formed with an axial bore 16 extending throughout its length and slidably supporting therein a reciprocable drive shaft 18.

The drive shaft 18, as shown, is supported at one end by means of a bearing sleeve 20 and at its other end by means of an adjusting rod 22 secured thereto and which extends axially through a bore 24 formed in a centering plug 26. The centering plug 26 may be threaded as at 28 on one end and adapted to be threadably secured within the end portion of the quill 10 by means of a threaded bore 30 provided on the inner surface of the quill 10. The centering plug 26 may be provided at its other end with a tool engaging surface 32 to facilitate axial adjustment of the plug within the quill 10. The adjusting rod 22 is shown as extending slidably through the centering plug 26 and as having its other end terminating exteriorly of the plug defining a reduced cross-sectional surface 34 for engagement with a pneumatic or hydraulic power actuated piston and cylinder (not shown). A locking means, in the form of a jam nut 38, may be threadably secured to the exteriorly extending portion of the adjusting rod 33 to facilitate a predetermined axial adjustment of the drive shaft 18 within the quill 10.

In the drawings, the tire building drum, shown generally at 40, is mounted on the horizontal rotary power quill 10. The drum structure includes a pair of concentrically disposed generally cone-shaped cam members 42 and 44 fastened around the quill 10 by means of a pair of roll pins 46 and 48 which extend through vertical bores provided in the cam members. The quill 10 may be provided with longitudinally extending slots 50 which are adapted to slidably receive the roll pins 46 and 48, thus allowing axial movement of the cam members with respect to the outer surface of the quill 10. The outer periphery of the cam members 42 and 44, as shown, are formed with generally annular cam surfaces 52 and generally annular tapered cam surfaces 54 which coact in a camming relation, respectively, with complementary cam surfaces on the drum segments. With this arrangement, the drum segments can be collapsed and expanded in the manner and for the purposes hereinafter described.

In the expanded form shown in the drawings, the middle portion of the tire building band is formed about the substantially cylindrical segmental drum 40, each segment of which preferably includes an arcuate base supporting member 56 and a pair of similar arcuate wing members 58 and 60 mounted for width-wise adjustment thereon. As shown in FIG. 3, each has supporting member 56 is formed on its undersurface with a pair of downwardly extending cam members 62 and 64 including complementary annular cam surfaces 66 and 68 adapted for relative camming coacting with the respective surfaces on the generally cone-shaped cam members 42 and 44. The base supporting member 56 is provided intermediate its marginal edge portions with a centrally located downwardly extending radial bearing sleeve 70 having a concentrically arranged bearing ring 72 disposed therein. The upper surface of the base member 56 is formed inwardly of its marginal edges with recesses 74 and 76 adapted to receive guide blocks 78 and 80 which are secured to the base member by means of screws 82. As shown, the upper surface of the base member 56 is further formed with a pair of slots 84 and 86 extending across the width of the upper surface of the base member and located adjacent and inwardly of the recesses 74 and 76. The slots 84 and 86 are adapted to receive a pair of endless elastic or resilient-like clamping means 88 and 90, such as coiled springs, which when applied around the respective ends of the base member segments 56 coact therewith in a manner to continuously urge the camming surfaces of the base members radially inwardly towards the respective camming surfaces of the conical cam-shaped members 42 and 44. It can be seen that the endless extensible clamping means 88 and 90 can readily be applied over the outer peripherial surfaces of the base members 56 via slots 84 and 86 and will act to continuously bias the base members radially inwardly, regardless of whether it is desired to either expand or collapse the tire building surface by axial adjustment of the conical cam members 42 and 44. In the form shown, the base supporting member 56 is formed with an arcuate undercut guide channel 92 which extends across the length of the base member intermediate to its end portions. The guide channel 92 is adapted to receive the spacer ring 110 (FIG. 1) for adjusting the width of the tire building surface and in a manner hereinafter to be more fully described.

In operation, the drum segments can be collapsed and expanded, simply by actuation of the drive shaft 18. Actuation of the drive shaft is accomplished from a suitable driver power (not shown) which is applied exteriorly to the adjusting rod 22 and transmitted axially to the drive shaft 18 through the centering plug 26 which acts as a support for one end of the drive shaft 18. Longitudinal movement of the roll pins 46 and 48 with respect to the slots 50 formed in the drive shaft causes the cone-shaped cam members to move axially with respect to the outer surface of the quill 10. Such axial movement of the cone-shaped cam members results in a camming coaction with respect to the corresponding cam members 62 and 64 which extend from the undersurface of the base member 56. Thus, the camming action results in a radial movement of the base members causing the drum segments to be collapsed or expanded as desired. It is to be further noted that the endless extensible clamping means 88 and 90, which extend around the entire annular surface formed by the base members 56, act in a manner to continuously urge the base members radially inwardly toward the central axis of the tire building drum. Such an arrangement provides a continuously uniform coaction between the corresponding cam surface of the cone-shaped cam members and the base members. Such uniform movement insures a controlled collapsing and expanding of the tire building surface to prevent distortion or non-uniformity when the carcass plies are applied or removed from the surface of the tire building drum.

Referring now more particularly to FIGS. 1 and 4 of the drawings, the arcuate wing members 58 and 60 form a pair of segmental wing sections mounted on the base member 56 for width-wise adjustment and are each provided with undercut key-way slots, such as 94 and 96 for securing and guiding, respectively, the guide blocks 78 and 80 carried by the base members. The wing members are formed at one end with upstanding portions 98 and 100 and are formed at their opposite ends with recess U-shaped supporting grooves 102 and 104, having a radius sufficient to maintain a second pair of endless extensible clamping means 106 and 108 therein.

In the form shown, the endless extensible clamping means 106 and 108 may comprise elastic or resilient-like means such as relatively heavy rubber-bands or endless coiled springs sufficiently tensioned to maintain the wing members in predetermined position on the base members 56. The endless extensible clamping means 106 and 108 are adapted to be snapped into position within the U-shaped groove 102 and 104 of the wing members, which form an endless supporting surface for the extensible means around the peripheral surface of the tire building drum. The endless extensible clamping means engage the peripheral surface of the tire building segment in a manner to continuously urge the outer ends of the wing members radially inwardly towards the axis of the quill 10, thereby locking the wing members in conjunction with the spacer member 110 against the base member 56.

In the preferred form shown in the drawings, the wing members 58 and 60 are shown separated axially from each other by means of a spacer member 110 which is also in the form of an arcuate ring segment and which is an improvement over the spacer member, such as shown in Letters Patent of the application to Deibel, Serial No. 583,431, filed May 8, 1956, now Patent No. 2,980,160, dated April 18, 1961, and assigned to the same assignee of the present application. As shown in FIG. 5, the spacer member 110 is of a generally T-shaped configuration having downwardly extending flange portions 112 and 114 extending along its marginal edges and a downwardly extending body portion 116 of greater dimension extending intermediate the flange portions which, together with the flange portions 112 and 114, form undercut channels 118 and 120, which are adapted to engage in locking relation the upstanding portions 98 and 100 of the respective wing members. The body portion 116 of the spacer member may be formed at its lower edge with a downwardly extending arcuate projection 121 of reduced cross-sectional dimension which is adapted to slidably engage the undercut guide channel 92 of the base member 56. An axial bore 122 extends through the spacer member and is adapted to receive a screw 124 for securing the spacer member to the base member 56, as shown by the dotted lines at FIG. 5.

To further guide and steady the segmental wing and spacer members, 58, 60 and 110 in their radial expanding and collapsing movement, there is associated with each of the segments a telescoping guide arrangement extending from a circular or polygonal shaped hub 126, which is secured to the guill 10. In the preferred form shown at FIG. 6, the hub 126 is in the form of a regular polygon, namely, a decagon with the number of planar faces corresponding to the number of segmental assemblies required to complete the annular tire building surface. The telescoping guides for the segmental assemblies include radially extending guide studs 128 which rigidly fit into holes 130 drilled into the planar faces 132 of the hub 126 and secured therein by means of roll pins 134 extending transversely through the hub 126 and through the holes formed in the guide studs 128. Towards their radially outer ends, the guide studs 128 extend slidably into the respective radial bearing sleeves 70 that extend from the bottom of the base members 56. It can be seen that such a telescoping stud and sleeve arrangement guides and steadies the segmental assemblies during the collapsing and expanding movement of the segments along a radial path.

In operation, when it becomes necessary to vary the width of the tire building surface of the drum, it is simply a matter of unsnapping the endless extensible clamping means 106 and 108 from within the U-shaped grooves 102 and 104 to thereby release the radial force exerted on the outer ends of the wing members. The spacer member 110 is then released merely by loosening the screw 124 which allows the wing members to be axially positioned to accommodate a new spacer member of the desired width, such as shown at 136 of FIG. 4. Once the new spacer member has been selected, the wing members may be repositioned with their upstanding portions 98 and 100 underlying the overlapping flanges 112 and 114 of the new spacer member 136 which is then secured to the base 56 by means of a suitable screw 124. The endless extensible clamping means 106 and 108 are again snapped into position to urge the outer ends of the wing members radially inwardly against the retaining force of the spacer member, to thereby lock the wing members against the base members. Because of the overlapping relation of the spacer members relative to the wing members, in coordination with the radial force exerted by the endless extensible clamping means, the adjustment in width of the building surface may be accomplished without disturbing the smooth continuity of the surface. Additionally, it may be noted that the spacer member is accurately aligned with respect to the base member and is positively secured to the base member in a manner that will prevent the spacer member from accidently flying from the drum as a result of the high rotational velocity thereof during a portion of the operational cycle.

With this improved arrangement, the tire building surface of the drum may be adjusted axially without distortion or disturbing the continuous tire building surface. It is to be understood that axial adjustment of the tire building surface of the drum may be applied to a non-collapsible as well as to a collapsible tire building drum. The adjustment is simple and economical because of the interlocking relationship between the spacer and wing members and is rapidly assembled and disassembled through use of the endless extensible clamping means which cooperate with the spacer members to secure the wing members to the base members.

I have shown and described what I consider to be the preferred embodiment of my invention, together with suggested modified forms, and it will be obvious to those skilled in the art that other changes may be made without departing from the scope of my invention as defined by the appended claims.

I claim:
1. A tire building drum comprising in combination:
   (a) an arcuate base member adapted to be mounted for rotation about a central axis;
   (b) arcuate wing members removably supported on said arcuate base member and adapted for axial width-wise adjustment relative to said base member to form a continuous tire building surface;
   (c) endless extensible clamping means engaging an outer marginal edge of each of said wing members for maintaining said wing members in any predetermined position on said base member;
   (d) guide means disposed on said base member and coacting with said wing members for retaining said wing members in any predetermined axial position on said member, and
   (e) interchangeable spacer means removably secured on said base member in overlapping relation with respect to an inner marginal edge of said wing members for maintaining a substantially continuous tire building surface for any predetermined axial adjustment of said wing members.

2. The tire building apparatus according to claim 1, wherein said endless extensible clamping means comprises:
   (a) a spring for continuously urging the wing members radially inwardly against said base member.

3. The tire building apparatus according to claim 1, wherein said overlapping relation comprises:
   (a) a downwardly projecting flange extending along each marginal edge of said interchangeable spacer means disposed in overlapping relation with respect to,
   (b) an upwardly projecting flange extending along the inner marginal edge of the corresponding wing members whereby the upper arcuate faces of said interchangeable spacer means and said wing members provide a substantially continuous tire building surface.

4. Tire building apparatus according to claim 1, wherein the wing members are provided having,
   (a) an axially extending undercut slot on their under surface adapted for coaction with said guide means disposed in said base member to retain said wing members in any predetermined axial position on said base member.

5. A tire building drum comprising in combination:
   (a) a plurality of arcuate segments forming an annular base member adapted for rotation about its central axis,
   (b) a plurality of arcuate wing members removably supported on said annular base member and adapted for axial width-wise adjustment relative to said annular base member to form a continuous annular tire building surface,
   (c) a pair of endless extensible clamping means,
   (d) a pair of endless flange formed along the outer peripheral marginal edges of said wing members adapted to receive said endless extensible clamping means for maintaining said wing members in any predetermined position on said annular base member.
   (e) guide means disposed on said annular base member and coacting with said wing members for retaining said wing members in any predetermined axial position on said annular base member,
   (f) and a plurality of arcuate interchangeable spacer means removably secured on said annular base member in overlapping relation with respect to an inner marginal edge of each of said wing members for maintaining a substantially continuous tire building surface for any predetermined axial adjustment of the wing members.

6. The tire building apparatus according to claim 5, wherein said pair of endless extensible clamping means comprise,
  (a) a springs for continuously urging the wing members radially inwardly toward the central axis of said annular base member for clamping said wing members against said annular base member.

7. The tire building apparatus according to claim 5, wherein said overlapping relation comprises,
  (a) a downwardly projecting flange extending along each marginal edge of said arcuate interchangeable spacer means disposed in overlapping relation with respect to,
  (b) an upwardly projecting flange extending along the inner marginal edge of the corresponding wing members, whereby the upper arcuate bases of said interchangeable spacer means and said wing members provide a substantially continuous tire building surface.

8. The tire building apparatus according to claim 5, wherein the wing members are provided having,
  (a) an axially extending undercut slot on its under surface adapted for coaction with said guide means disposed in said annular base member to retain said wing members in any predetermined axial position on said annular base member.

9. A tire building drum comprising in combination;
  (a) a plurality of arcuate segments forming an annular base member adapted for rotation about its central axis,
  (b) a plurality of arcuate wing members removably supported on said annular base member and adapted for axial width-wise adjustment relative to said annular base member to form a continuous annular tire building surface,
  (c) a pair of endless extensible clamping springs,
  (d) a pair of endless flanges formed along the outer peripheral marginal edges of said wing members adapted to receive said endless extensible clamping springs for continuously urging the wing members radially inwardly toward the central axis of said annluar base member for clamping said wing members in any predetermined position on said annular base member,
  (e) guide means disposed in said annular base member and coacting with said wing members for retaining said wing members in any predetermined axial position on said annular base member,
  (f) and a plurality of arcuate interchangeable spacer means removably secured on said annular base member in overlapping relation with respect to an inner marginal edge of each of said wing members.

10. A tire building apparatus according to claim 9, wherein said overlapping relation comprises;
  (a) a downwardly projecting flange extending along each marginal edge of said arcuate interchangeable spacer means disposed in overlapping relation with respect to,
  (b) an upwardly projecting flange extending along the inner marginal edge of the corresponding wing members whereby the upper arcuate bases of said interchangeable spacer means and said wing members provide a substantially continuous tire building surface.

References Cited by the Examiner

UNITED STATES PATENTS

| 2,583,650 | 1/52 | Hodgkins | 156—415 |
| 2,979,110 | 4/61 | Henley | 156—415 |

FOREIGN PATENTS

| 427,123 | 4/35 | Great Britain. |

ALEXANDER WYMAN, *Primary Examiner.*
HAROLD ANSHER, *Examiner.*